United States Patent [19]

Nixon

[11] 3,773,113
[45] Nov. 20, 1973

[54] CULTIVATOR
[76] Inventor: Douglas C. Nixon, 5864 Carson Rd., Akron, Mich. 48701
[22] Filed: Jan. 19, 1971
[21] Appl. No.: 107,725

[52] U.S. Cl.................. 172/642, 172/710, 172/686
[51] Int. Cl............................................. A01b 19/00
[58] Field of Search.................... 172/265, 264, 705, 172/707, 708, 710, 711, 139, 192, 195, 315, 691, 763

[56] References Cited
UNITED STATES PATENTS
2,585,669  2/1952   Metcalf............................... 172/642
3,258,076  6/1966   Groenke............................. 172/710
3,160,123  12/1964  Roquemore...................... 172/42 X
3,089,529  7/1963   Wade et al......................... 172/265

Primary Examiner—Robert E. Pulfrey
Assistant Examiner—Stephen C. Pellegrino
Attorney—Irving M. Weiner

[57] ABSTRACT

Apparatus for converting a field cultivator shank assembly to a crop cultivator including a "T" standard coupled to a crop cultivating tool; said standard is adapted to be coupled to a cultivator frame. The crop cultivating tool includes a shank, a blade support pivotally connected to one end of the shank, and resiliently coupled to the other end of the shank, and a plurality of blades attached to said blade support. The blades are vertically and rotatably adjustable.

3 Claims, 5 Drawing Figures

INVENTOR.
DOUGLAS C. NIXON

CULTIVATOR

BACKGROUND OF THE INVENTION

To fully comprehend the advantages of the present invention it is necessary to differentiate between field cultivators and row or crop cultivators. Field cultivators are used for harrowing a field prior to planting, for killing weeds, and for renovating hay land. Typical field cultivators are illustrated in Groenke U.S. Pat. No. 3,258,076 and Van Peursem U.S. Pat. No. 3,493,055. In each of these patents the cultivating tool is resiliently mounted to a frame member; in each patent there is a pressure spring which urges the cultivator blade into the soil, and because of the resiliency of the spring, the cultivator blade swings clear of obstructions such as rocks, etc., in the soil.

In comparison, a row or crop cultivator (also known as a mulcher) operates to cover weeds and other undesirable growth between the rows of crops and, at the same time, moves fresh soil over the roots of the growing crops. Such a row cultivator is seen, for example, in Metcalf U.S. Pat. No. 2,585,669.

As may be readily understood from a comparison of these two functions, a row cultivator must be somewhat more exacting than a field cultivator to avoid damaging the young crops. For this reason, pressure springs have not been utilized in row cultivators prior to the present invention.

Several other problems with the prior art row cultivators include the fact that they will pull the same amount of soil at all speeds and will plug up easily. Thus, it is necessary to clean the blades often and to reduce the depth of penetration when going at slightly faster speeds. The prior art row cultivators may not dig into hard soil at all, and when they do dig into hard soil the penetration is seldom uniform, they would frequently twist or bend upon coming into contact with objects such as rocks, and the blades would not remain in proper alignment when cultivating rough soil.

It has not been feasible to use the pressure spring principles from field cultivators prior to the present invention because there was not any means of attaching the field cultivator shank assembly to a row crop cultivator, nor the special cultivating tools required for row crop cultivating. The present invention provides both.

SUMMARY OF THE INVENTION

The present invention provides apparatus for converting a field cultivator spring leaf shank assembly to a crop cultivating tool and adapted to be coupled to a cultivator frame. The crop cultivating tool includes shank, a blade support pivotally connected to one end of the shank and resiliently coupled to the other end of the shank, and a plurality of blades attached to said support. The blades are vertically and rotatably adjustable. The "T" standard may be coupled directly to the vertical shank.

Accordingly, with the aforementioned prior art problems in mind, it is an object of the present invention to provide a novel resiliently biased crop cultivator.

It is another object of the present invention to provide a cultivator spring leaf shank or frame which can be utilized for both field and row cultivators.

It is yet another object of the present invention to provide a crop cultivator which provides all the benefits of the prior art field cultivators, yet is sufficiently accurate to prevent damaging of growing crops.

It is a further object of the present invention to provide a pressure spring crop cultivator having adjustable blades, adjustable soil penetration, and resistance to frequent misalignment.

These and other objects are accomplished in a row crop cultivator including a vertical shank and a blade support pivotally connected to the lower end of the shank and resiliently connected to the upper end of the shank. Vertically and rotatably adjustable blades are attached to said blade support. A T standard is coupled to the vertical shank and is adapted to engage the frame of the crop of field cultivator. Alternatively the T standard may include an intermediate cultivator beam support.

BRIEF DESCRIPTION OF THE DRAWINGS

The above-mentioned objects of the invention, together with other objects and advantages which may be attained by its use, will be more fully appreciated upon reading the detailed description of the invention in conjunction with the drawings. In the drawings, wherein like numerals identify similar parts.

DETAILED DESCRIPTION OF THE INVENTION

Figure 1:
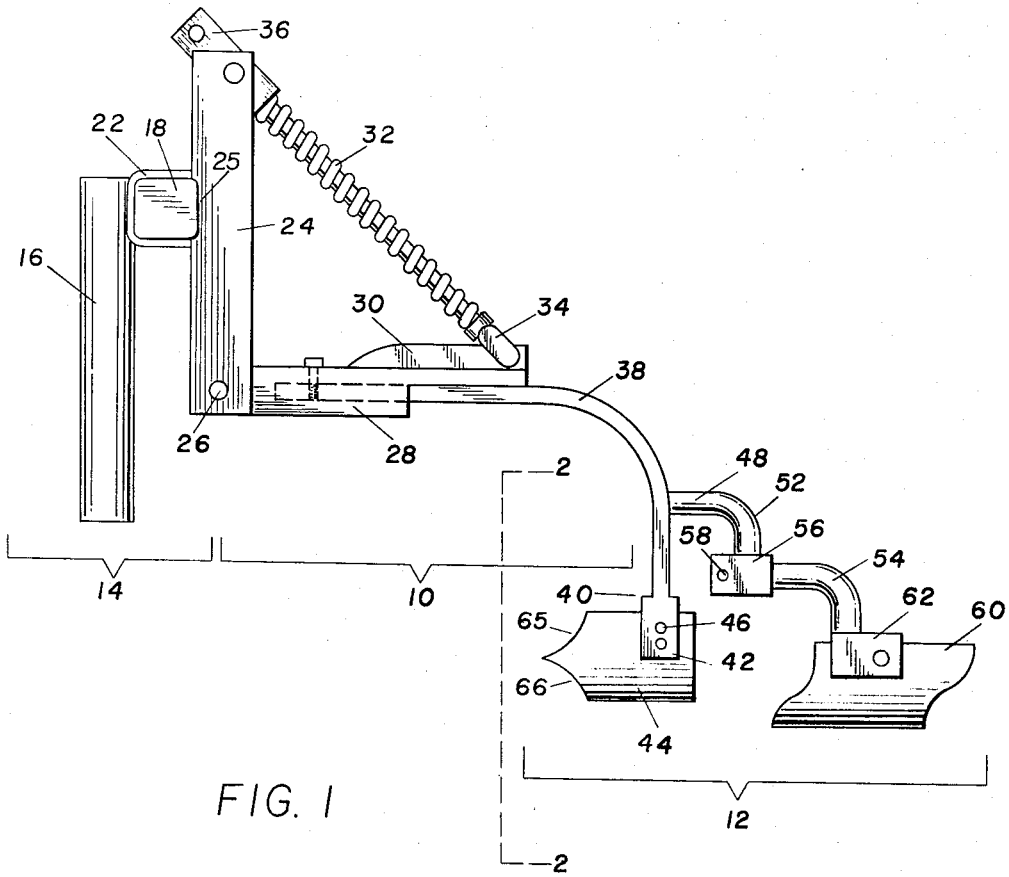
FIG. 1 is an illustration of one embodiment of the T standard and the crop cultivator frame and blade assembly of the present invention.

Referring first to FIG. 1, one embodiment of the present invention is shown. The row cultivator may be thought of as having three major parts; the vertical shank including the pressure spring 10, the blade portion 12, and the T standard 14, which is optional.

One embodiment of the standard, or T standard (so called because of its T cross-sectional shape), includes a shaft 16 which is welded to a piece of rectangular tubing 18. By way of example, the shaft 16 may be one and three-eighths inch cold roll steel and the tubing 18 may be a two and one-half inch square. Two U-shaped clamps 22 (only one is shown in FIG. 1) may be used to fasten the standard 14 to the shank and spring portion 10.

The shank and pressure spring portion 10 is generally well-known in the field cultivator art. For example, the aforementioned patent to Groenke provides sufficient detail to enable one to construct the vertical shank and pressure spring portion 10 of the present invention. Referring to FIG. 1 of my drawings, by way of brief illustration only, the shank and pressure spring portion 10 includes a vertical shank member 24 having an indentation 25 to accept one end of the beam support 18. The lower end of shank 24 may be pivotally connected at 26 to a blade support member 28. The blade support member 28 may include an upper ribbed member 30. The lower end of a spring 32 may be pivotally connected at 34 to one extremity of the ribbed member 30. The opposite end of the spring 32 may be pivotally connected at 36 to the upper end of the vertical shank 24. As the cultivator is pulled, the spring 32 urges the bades into the soil and provides resiliency if the blades should strike rocks in the soil.

Affixed to the blade support member 28 may be one or more shank leafs 38. If the shank leaf 38 terminated in a plain shovel or cultivating tool, as in the patent to Groenke, then the shank and tool would typify a field cultivator. A plurality of such shanks and tools, aligned transversely, may be used to harrow or plow any desired width of the field.

However, according to the principles of the present invention, the lower end of shank leaf 38 may be given a twist 40, for example, 128 45°. Then, affixed to the lower end 42 of the leaf 38 is a forward row cultivating blade 44. Two bolts 46 may be used to attach the forward blade 44 to the end 42 of the shank leaf 38.

A second blade support member 48 may be part of or welded to the shank leaf 38 just above the location of the twist 40. At the opposite end of support member 48, there is welded a round shaft 52 which secures a vertical support member 52 to the shank leaf support 38.

As part of the second blade support is a rearwardly projecting member 54 which may be mounted on a vertical shaft 52 at a point intermediate its length, and a clamp, which may be, for example, a split clamp 56, is formed on one end of blade support 54 to secure the support to the vertical shaft 52. A bolt 58 may be used to secure the split clamp 56 to the vertical shaft 52.

Attached to the opposite end of support 54 is rear blade 60. A clamp or one bolt 62 may be used to attach rear blade 60 to blade support 54 so that the blade 60 may be adjusted vertically or rotated for field adjustment. The apparatus comprising the front and rear blades and the associated connecting hardware may be referred to collectively as the blade portion 12.

Figure 2:
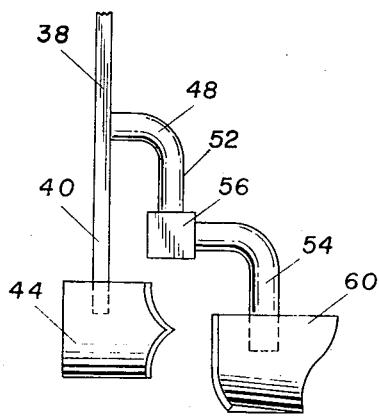
FIG. 2 is a side elevation view of the present invention taken along the line 2—2 of FIG. 1.

FIG. 2 illustrates a side elevational view of the blade portion 12 of the present invention taken along line 2—2 of FIG. 1. As illustrated in FIG. 2, the front blade 44 is set inward at a slight angle. The purpose of this is to cover weeds, etc., in the rows between the crops when the row cultivator is pulled along a planted field. The rear blade 60 is also set inward at a slight angle but the opposite way from a reference vertical such as shank leaf 38. Furthermore, considering both FIGS. 1 and 2 it is apparent that not only is blade 60 behind blade 44 but it is also offset laterally. Thus, when the apparatus is pulled along the planted field, front blade 44 cultivates weeds away from the crops and then rear blade 60 pushes fresh soil onto the roots of the crops.

This will be more apparent when it is realized that front and rear row cultivator blades are both paired; thus two front blades cover or harrow or plow weeds between the rows of crops, while two rear blades place fresh soil on the roots of the crops.

Figure 3:
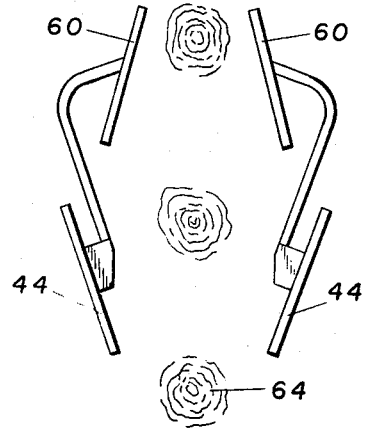
FIG. 3 is a top plan view of the blade portion of present invention.

This is illustrated diagrammatically in FIG. 3 which is a partial top view of two sets of blades being used to cultivate a row of crops. When the tandem or paired blades are pulled along a row of crops, the front blades 44,44 operate to shift stones, lumps, debris, etc., away from the row of plants 64 as well as covering up any weeds along the path of travel. The rear blades 60,60 will then operate in clean, level soil and will cover the roots of the young crops with fresh soil. Furthermore, the pressure spring action will operate to maintain a firm, constant pressure on the blades to provide even, uniform cultivating operation, yet there will be sufficient resiliency if a foreign object lies along the path of travel to lift the blades free of the crops and to keep the blades in alignment.

With this basic understanding of the principles of the present invention, various additional features and modifications will now be illustrated and explained.

There are several advantages of using a pressure spring in a row cultivator. The resiliency prevents the blades from becoming entangled in hard soil and, if the speed of the tractor or pulling device should increase, less soil would be cultivated and/or plowed. Thus, the operator of this device can control the amount of soil flow to which he harrows or plows by varying the speed of the tractor. The pressure from the spring provides relatively uniform penetration; it is, therefore, unlikely that some crops would be smothered while others are virtually not covered with soil. Furthermore, if the soil is not level, the pressure spring enables the blade to ride with the crests and dip into valleys in the soil, thus providing a resulting level crop cultivation.

The front blade 44 may be bolted solidly to the shank. This will maintain alignment to prevent chewing up the crops, especially when cultivating in rough soils. Alternatively front blade 44 may be rotatably mounted similar to the rear blade. The front blade 44 has a long lip in front 65 and a slightly curved bottom 66 (see FIG. 1) to reduce the flow of soil around the front of the tool. Reducing this flow of soil tends to eliminate accidental burying of small crops.

Although there are many commercial cultivators being sold, virtually all of them are adapted to receive a one and three-eighths inch shaft for attaching the cultivator standard. Therefore, the use of the present T standard enables one to utilize the present invention on virtually all commercial cultivators. By using sets of blades and T standard of the present invention, the user may convert his crop cultivator into a pressure spring row or crop cultivator.

In addition to compatibility, another feature of the T standard is that the shank portion may be rotated slightly, (as explained hereinafter) and/or moved vertically upwards or downwards. This provides several variations; for example, the angle of harrowing or plowing may be changed by rotating the shank; thus only a minor adjustment is necessary when changing from one field having a particular spacing between rows of crops to another field having a different spacing between the rows. Furthermore, the vertical adjustment may be used to change the penetration or depth of the cultivating.

If one desiring to utilize the present invention has a conventional crop cultivator with fixed (non-spring) blades, it is normal for the vertical shaft holding these blades to be one and three-eighths inches. Removal of the old blades and insertion of the T standard with blades attached enables conversion of the old crop cultivator to a pressure spring crop cultivator.

Figure 4:
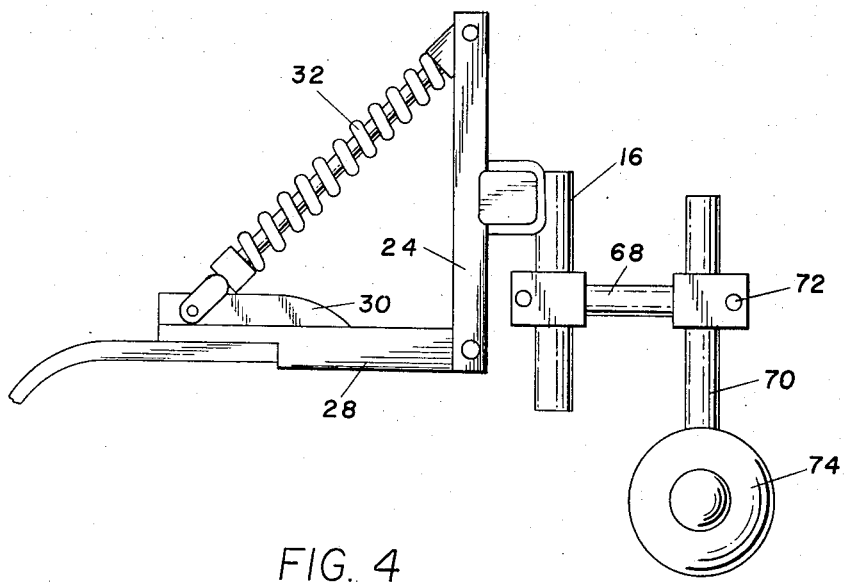
FIG. 4 is an illustration of the support portion of the invention illustrating a second embodiment of the blade support.

With reference to FIG. 4, it is realized that various additional features may be used in conjunction with the present invention. FIG. 4 illustrates a second embodiment of a row cultivator according to the principles of the present invention but including an additional leg or shaft. As a practical matter, if one desires to cultivate a crop such as the sugar beet, the additional leg, equipped with a weeding disk, would be necessary. As shown in FIG. 4, an additional leg 68 is connected from the vertical support 16 forward of the vertical shank 24. This additional leg terminates in a sleeve which surrounds another vertical shank 70. Bolt 72 may be used to tighten the sleeve and a cultivating implement, such as a weeding disk 74, may be attached to the bottom of the shank 70. This eliminates the need for removing the T standard for the first cultivation of certain crops, e.g., sugar beets.

When using crop or row cultivators, it is necessary to be able to adjust the bit or angle of the blades as desired. In the present invention this may be done in several ways. Not only can the angle of the vertical T standard be changed, but the degrees of twist at 40 in the shank leaf 38 can be preselected, or a shim with a preselected angle may be inserted behind any one of the aforementioned blades. In addition, it is well known in the prior art to provide a rotatable connection between each blade and the support member associated therewith as previously explained with reference to rear blade 60.

Figure 5:
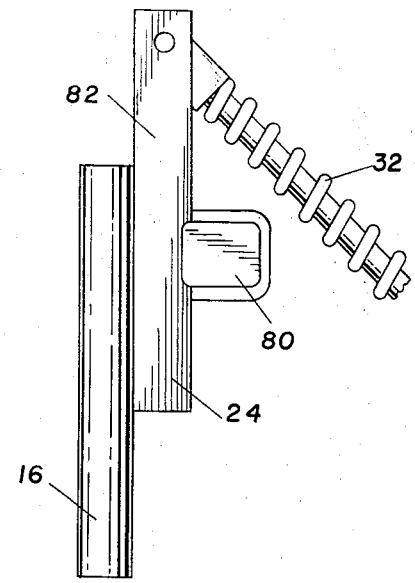
FIG. 5 is an illustration of a second embodiment of the T standard showing a portion of the vertical shank.

One additional variation is illustrated in FIG. 5. FIG. 5 depicts the shank and spring portion of a prior art field cultivator. It is noted that the beam support 80 is intermediate the vertical shank 24 and the spring 32 as contrasted with FIG. 1 of the present invention wherein the beam support 22 is part of the T standard and is forward of the vertical shank 24.

By redesigning side plates of shank 24 (see plates 82 on each side of vertical shank 24, only one such plate is shown), the vertical shaft 16 may then be welded to the vertical shank 24. Thus the T standard may be utilized without the intermediate beam support. This provides the ability to rotate the entire tool assembly within the clamp of the cultivator harness (assuming no intermediate beam support 80 is used.) Thus, the angle of the blades may be adjusted and a second embodiment of the blades may be interchangeably used in a frame to provide either a row or field cultivator.

Prior to the present invention, it was necessary to remove the complete standard and sweep which required tedious and time consuming readjusting when changing between crops (sugar beets to beans or corn). The present invention requires that only the shank leaf support 38 be removed; consequently the standard would not need readjusting.

I claim:

1. In a row or crop cultivator of the type having a vertical shank coupled to a beam and a plurality of blades including a first blade disposed at an angle to smooth soil away from a row of crops and a second blade disposed at an angle to move fresh soil on and in between the crops in said row, an attachment therefor comrpising:

a first rearwardly and downwardly extending blade support pivotally connected to the lower end of the shank, the first blade being connected to the first blade support, a second rearwardly and downwardly extending blade support connected to the first blade support, the second blade being connected to the second blade support, and means resiliently coupling the first blade support to the vertical shank.

2. The attachment characterized in accordance with claim 1, including, in combination, means connected to said second rearwardly and downwardly extending blade support for adjusting the amount of soil moved onto said crops by said second blade.

3. The apparatus characterized in accordance with claim 1, including, in combination, means connected to said second rearwardly and downwardly extending blade support for adjusting the relative position of said blades.

* * * * *